Figure 1:
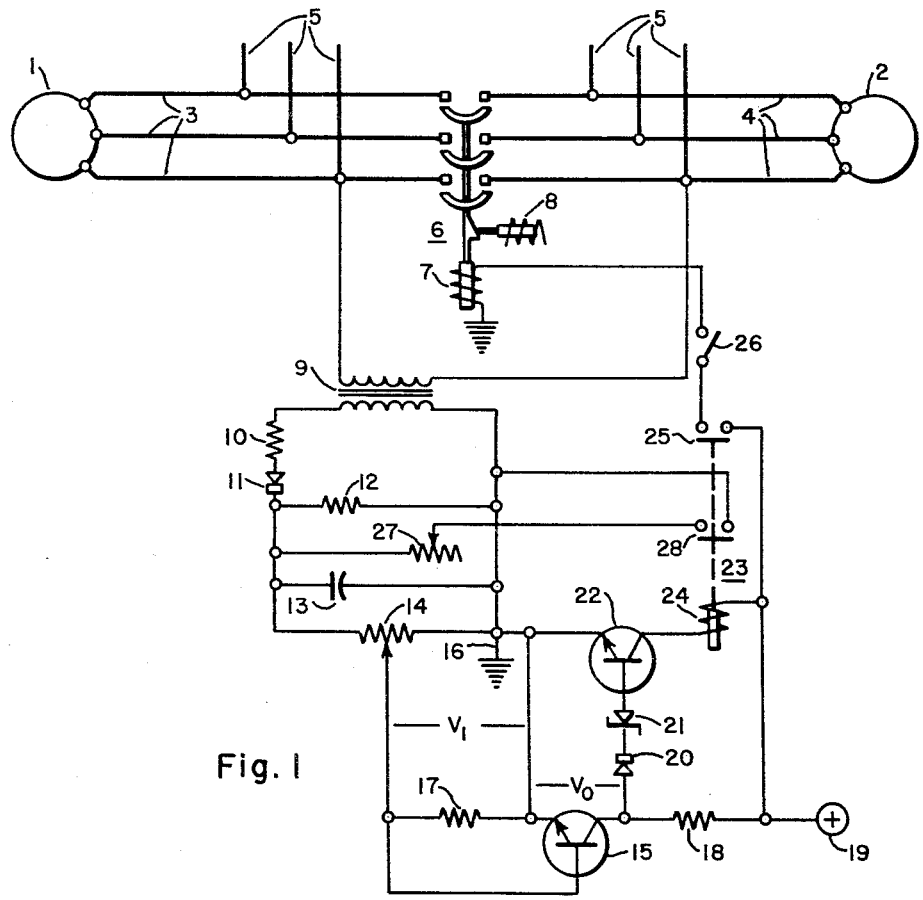

Dec. 18, 1962 L. L. KESSLER 3,069,555
AUTOMATIC PARALLELING SYSTEM
Filed Feb. 11, 1960

WITNESSES
Leon J. Vaza
James F. Young

INVENTOR
Leland L. Kessler
BY
ATTORNEY

United States Patent Office 3,069,555
Patented Dec. 18, 1962

3,069,555
AUTOMATIC PARALLELING SYSTEM
Leland L. Kessler, Lima, Ohio, assignor to Westinghouse Electric Corporation, East Pittsburgh, Pa., a corporation of Pennsylvania
Filed Feb. 11, 1960, Ser. No. 8,023
6 Claims. (Cl. 307—87)

The present invention relates to automatic paralleling of alternating current generators, and more particularly to an improved system for controlling the connection of an alternating current generator to an energized line or bus for operation in parallel with one or more other generators.

When an alternating current generator is to be operated in parallel with one or more other generators, the generators must be close to synchronism with each other when they are connected together, or when the incoming generator is connected to a line or bus to which the other generators are already connected. This means that the voltage, frequency and phase angle of the incoming generator and of the line must be close to the same values, within predetermined limits, in order to prevent excessive system transients, and so that the incoming generator will pull into synchronism with the line and operate properly in parallel with the other generators.

When the generators are provided with control means or regulators which hold the frequency and voltage of the generators close to the desired values, paralleling can be accomplished by providing sensing means for sensing the frequency and phase angle differences between the generator and the line. The sensing means then controls the circuit breaker of the incoming generator to cause the breaker to close at the correct instant when the incoming generator is sufficiently close to synchronism with the line.

Static sensing means are preferably used for this purpose in applications such as in aircraft electrical systems, because of their high reliability under adverse environmental conditions and because they can be made quite small and light in weight. A static sensing means which has been successfully used for this purpose is disclosed and claimed in a patent of H. H. C. Richards, Jr. et al., No. 2,862,111. This system senses the frequency and phase differences between the incoming generator and the line and provides an output voltage pulse when the conditions are correct for paralleling which can be used to control the closing of a circuit breaker to connect the incoming generator to the line.

The length of this output voltage pulse, however, is quite critical. Even high speed circuit breakers require a definite minimum time to close and if the voltage pulse is too short, the breaker will fail to close before the pulse terminates. If this occurs, the breaker will attempt to close each time the generator passes through synchronism with the line and will continue to cycle. If the voltage pulse is too long, however, it is possible for the breaker to close after the generator has passed through synchronism with the line and the phase angle has become too great for successful paralleling, resulting in excessive transients on the system. Obviously, either of these conditions is undesirable and it is necessary therefore to insure that the voltage pulse which controls the circuit breaker is of proper length.

The principal object of the present invention is to provide an automatic system of the type described above for effecting paralleling of alternating current generators in which the voltage pulse which is used to control the closing of the generator circuit breaker is maintained for a sufficient time to insure closing of the breaker when the conditions are correct for paralleling.

A further object of the invention is to provide an automatic paralleling system for alternating current generators utilizing a sensing circuit for providing an output voltage pulse to control the closing of a generator circuit breaker when conditions are correct for paralleling, in which the voltage pulse is maintained until the phase difference between the incoming generator and the line exceeds a predetermined value, to insure a sufficiently long voltage pulse to effect closing of the breaker.

Figure 2:
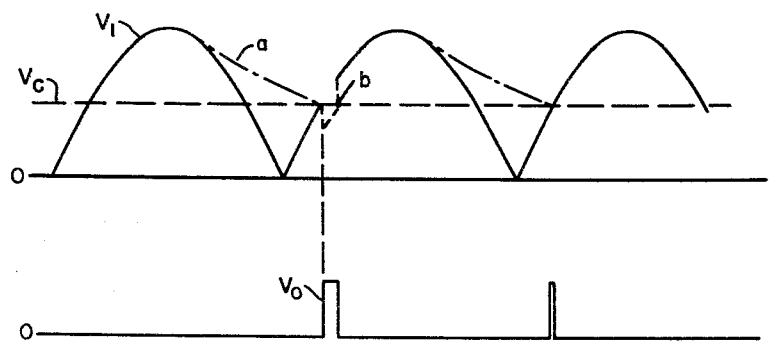

Other objects and advantages of the invention will be apparent from the following detailed description, taken in connection with the accompanying drawing, in which:

FIGURE 1 is a schematic diagram showing a preferred embodiment of the invention; and FIG. 2 is a diagram showing certain voltages appearing in the circuit of FIG. 1.

The invention is shown in FIG. 1 embodied in a system for controlling the paralleling of two alternating current generators 1 and 2. The generators 1 and 2 may be any desired type of alternating current generators, and are shown as three-phase generators connected to three-phase lines or buses 3 and 4, respectively, for supplying load buses 5. The generators are connected together for parallel operation by means of a circuit breaker 6 which connects the buses 3 and 4 together. The circuit breaker 6 may be any suitable type of breaker and is shown as having a closing coil 7 which is controlled automatically, as hereinafter described, and which may also be provided with any desired additional means for automatic or manual operation. The breaker 6 also has a trip coil 8 which may be controlled manually or automatically in any desired manner.

It will be understood that, as is usual in systems of this kind, the generators 1 and 2 are provided with voltage regulators of any usual or suitable type which maintain the generator voltages sufficiently close to the desired value to permit paralleling. The system thus far described is to be taken as representing any system in which an alternating current generator is to be connected for operation in parallel with one or more other generators, and the circuit breaker 6 represents any suitable switching means for connecting an incoming generator to an already energized line or generator.

As previously discussed, the circuit breaker 6 must be controlled so that it closes only when the incoming generator is close enough to synchronism with the line to permit paralleling. The breaker therefore must be controlled so that it can close only when the frequencies and phase angles of the incoming generator and of the line are close enough to enable the generator to pull into synchronism without excessive transients. For this purpose, there is provided a static sensing circuit of the type disclosed in the above-mentioned patent. The sensing circuit includes a sensing transformer 9 which has its primary winding connected to corresponding phase voltages of the two generators 1 and 2 so that these voltages subtract vectorially in the transformer primary. The secondary voltage of the transformer 9, therefore, has a maximum value when these voltages are 180° out of phase and has a minimum value, approaching zero, when they are exactly in phase. The output voltage of the transformer 9 is thus a pulsating alternating current voltage which pulsates at a frequency equal to the difference in frequency between the generators 1 and 2 and which approaches zero when the phase difference between the generators approaches zero.

The output voltage of the transformer 9 is connected through a resistor 10 to a half-wave rectifier 11, and a resistor 12 and capacitor 13 are connected across the rectified output voltage. The output voltage of the transformer 9 is thus rectified, and filtered by the RC circuit comprising the resistor 12 and capacitor 13, and this rectified and filtered voltage is applied to a potentiometer 14 to provide an adjustable output signal voltage $V_1$.

The signal voltage $V_1$ thus obtained is the envelope of the pulsating secondary voltage of the sensing transformer 9, as filtered and modified by the RC circuit, and is shown in the upper part of FIG. 2. The discharge envelope of the capacitor 13, on the decreasing portions of the voltage cycles, is indicated by the dotted lines $a$, the resultant voltage to ground across the potentiometer 14 being the voltage envelope $V_1$ as modified by the capacitor discharge envelope $a$.

The signal voltage $V_1$ across the potentiometer 14 is applied to the base of a transistor 15 the emitter of which is connected to ground 16, a bias resistor 17 preferably being connected across the emitter and base. The collector of the transistor 15 is connected through a current limiting resistor 18 to any suitable direct current source, diagrammatically indicated at 19. It will be seen that when the voltage applied to the base of the transistor 15 is above the minimum base voltage of the transistor for conduction, indicated at $V_c$ in FIG. 2, the transistor will be conductive and its collector will be substantially at ground potential so that no output voltage is obtained. When the voltage $V_1$ drops below the minimum conduction voltage $V_c$, however, the transistor 15 becomes non-conductive and an output voltage $V_o$ appears at its collector.

This output voltage is utilized to control the circuit breaker 6. In the illustrated embodiment of the invention, the collector voltage of the transistor 15 is applied through a blocking rectifier 20 and a Zener diode 21 to the base of a transistor 22. The transistor 22 controls a relay 23 which has an operating coil 24 connected to the direct current source 19 and through the transistor 22 to ground. Thus, when the transistor 22 is made conductive by the application of the collector voltage $V_o$ of transistor 15 to its base, the coil 24 is energized and the relay closes its contacts. The relay 23 has a normally open contact 25 which, for simplicity, is shown as being connected directly to the closing coil 7 of the breaker 6, through a manual control switch 26. Thus when the relay 23 is energized, the closing coil 7 is connected to the direct current source 19, if the switch 26 is closed, to close the breaker 6.

In the operation of this system, as so far described, the sensing circuit provides a signal voltage $V_1$ which, as previously explained, is a pulsating unidirection voltage which approaches zero when the generators 1 and 2 are exactly in phase and which has a frequency of pulsation equal to the frequency difference, or slip frequency, between the generators. This signal voltage, therefore, is representative of the phase and frequency differences between the generators, since its magnitude varies with the phase difference and its frequency varies with the slip frequency.

The signal voltage is applied to the base of the transistor 15 and maintains the transistor in a conductive condition as long as the voltage $V_1$ is above the minimum conduction voltage $V_c$ of the transistor, preventing operation of the circuit breaker 6. The voltage $V_1$ tends to drop as the phase angles of the generators approach equality but the resultant voltage is modified by the RC circuit 12—13 and remains above $V_c$ until the capacitor discharge voltage, indicated at $a$ in FIG. 2, falls below the voltage $V_c$. The point at which this occurs is, of course, determined by the steepness of the voltage wave and thus by its frequency, and if the slip frequency is too high the signal voltage remains above $V_c$. The signal voltage applied to the base of the transistor 15 therefore falls below $V_c$ only when the phase and frequency differences between the generators 1 and 2 are within the permissible limits for paralleling, the limits being adjustable by means of the potentiometer 14. When the voltage on the base of the transistor 15 falls below $V_c$, the transistor 15 becomes non-conductive and an output voltage pulse $V_o$ appears at the collector as shown in the lower part of FIG. 2. This voltage pulse is applied to the transistor 22 to effect closing of the circuit breaker 6 as previously described.

It will be seen that the length of the voltage pulse $V_o$ is quite critical since if it is too short the breaker may not close. Thus, for example, under the conditions illustrated in FIG. 2, which shows a slip frequency which is relatively high but still within the permissible limit for paralleling, the output voltage pulse is not initiated until after the generators have passed through zero phase difference, and the voltage pulse is of such short duration, as shown at the right of FIG. 2, that the breaker 6 does not have time to close before the energization of the relay 23 is cut off and the relay contacts open. Under these conditions, the breaker 6 will cycle, preventing connection of the generator to the line and possibly resulting in damage to the breaker. It will also be seen that at lower slip frequencies, the voltage pulse will be longer, and if the voltage pulse becomes too long, the breaker 6 may be permitted to close after the incoming generator has passed through synchronism with the line and the phase difference has become too great for successful paralleling.

In accordance with the present invention, means are provided for controlling the length of the output voltage pulse to insure that it is long enough to effect closing of the breaker but without permitting the breaker to close when the phase difference is too great. This is accomplished by controlling the length of the pulse in such a manner that when it is once initiated, the output voltage is maintained until the phase difference exceeds a predetermined value and the pulse is then terminated. This allows sufficient time for the breaker 6 to close when the conditions are correct but prevents closing of the breaker after the phase difference has become too great.

In the illustrated embodiment of the invention, this result is obtained by means of an adjustable resistor 27 which is connected in parallel with the resistor 12 and capacitor 13 by means of a contact 28 on the relay 23. Thus, when the relay 23 closes, the resistor 27 is connected in the R.C. circuit of the sensing means and has the effect of reducing the output voltage of the potentiometer 14.

This effect is illustrated in FIG. 2. It will be seen that when the signal voltage applied to the base of the transistor 15 falls below the conduction voltage $V_c$, the relay 24 is energized to close its contacts 25 and 28, as previously described, and an output voltage $V_o$, shown at the left in the lower part of FIG. 2, appears at the collector of the transistor 15. As soon as the relay contact 28 closes, the resistor 27 is connected to the sensing circuit and the signal voltage $V_1$ is reduced in magnitude, as shown by the dotted portion $b$ of the upper voltage curve of FIG. 2. This new voltage envelope is below the voltage $V_c$ so that the transistor 15 is kept in a non-conductive state, and the output voltage pulse is maintained, until the reduced signal voltage $V_1$ rises above the conduction voltage $V_c$. This point is determined by adjustment of the resistor 27 to correspond to the maximum phase difference between the generator and the line that can be permitted. At this point the transistor 15 again becomes conductive and cuts off the output voltage to the transistor 22, terminating the voltage pulse.

In this way, the output voltage pulse is maintained after it is once initiated until the phase angle between the generator and line has exceeded a maximum permissible value. The output voltage pulse thus is made of sufficient length to insure that the breaker 6 will close if the conditions are correct. If the frequency difference between the generator and the line is too great for successful paralleling, the frequency of pulsation of the signal $V_1$, which is equal to the frequency difference, is sufficiently high to prevent initiation of the output voltage pulse and the breaker cannot close. Thus, the effect of the system is to provide an output voltage pulse which is initiated whenever the phase and frequency differences are within predetermined limits and which is always of sufficient duration to insure closing of the breaker when the conditions are correct, while closing of the breaker is prevented when either the phase difference or the frequency difference are too great for successful paralleling. As previously indicated, the phase and frequency differences which are permissible can readily be adjusted by means of the potentiometer 14, and the duration of the output voltage pulse is adjustable by means of the resistor 27 which determines the extent of the reduction in magnitude of the voltage envelope $V_1$ when the relay 23 operates. Thus the output voltage pulse is always terminated at a predetermined phase difference and cannot be long enough to cause the breaker to close when the phase difference is too great.

It should now be apparent that an automatic paralleling system has been provided in which an incoming generator is paralleled with an already energized generator or line in a reliable and accurate manner. The circuit is relatively simple but is so arranged that the closing of the circuit breaker is reliably controlled so that if the conditions are correct the breaker will close without cycling, but will not be permitted to close after the phase difference between the generator and line becomes too great. The length of the voltage pulse which controls the circuit breaker is readily adjustable to suit the closing times of different circuit breakers and the entire circuit is simple and highly reliable. Thus, the uncertainty of operation of previous sensing circuits of this type due to the critical nature of the length of the output voltage pulse is eliminated and a greatly improved automatic paralleling system is provided.

A preferred embodiment of the invention has been shown and described for the purpose of illustration but it will be apparent that various modifications and other embodiments are possible. Thus, the output voltage pulse $V_0$ may be applied in any desired manner to control the circuit breaker 6. In the particular embodiment shown, this output voltage is used to control a transistor which in turn controls a pilot relay. It will be obvious, however, that any other type of control circuitry, either completely or partially static, might be utilized for controlling the breaker and any such arrangement is within the scope of the invention. It is to be understood, therefore, that the invention is not limited to the specific circuit arrangement and detailed operation shown for the purpose of illustration, but in its broadest aspect it includes all equivalent embodiments and modifications.

I claim as my invention:

1. A system for effecting paralleling of an alternating current generator with an energized alternating current line, said system including switch means for connecting the generator to the line, sensing means for sensing the phase difference and frequency difference between the generator and the line, circuit means controlled by said sensing means for providing an output voltage when said phase and frequency differences are within predetermined limits, and means responsive to said output voltage to effect closing of said switch means and to cause the output voltage to be maintained until the phase difference between the generator and the line exceeds a predetermined value.

2. A system for effecting paralleling of an alternating current generator with an energized alternating current line, said system including switch means for connecting the generator to the line, sensing means for sensing the phase difference and frequency difference between the generator and the line, circuit means controlled by said sensing means for providing an output voltage when said phase and frequency differences are within predetermined limits, and means responsive to said output voltage to effect closing of said switch means and to effect a change in the sensing means to cause the output voltage to be maintained until the phase difference between the generator and the line exceeds a predetermined value.

3. A system for effecting paralleling of an alternating current generator with an energized alternating current line, said system including switch means for connecting the generator to the line, sensing means for sensing the phase difference and frequency difference between the generator and the line, said sensing means being adapted to provide a pulsating signal voltage representative of said phase and frequency differences, circuit means for providing an output voltage when said signal voltage is below a predetermined value, and means responsive to said output voltage for effecting closing of the switch means and for reducing the magnitude of the signal voltage to maintain the output voltage until the phase difference between the generator and the line exceeds a predetermined value.

4. A system for effecting paralleling of an alternating current generator with an energized alternating current line, said system including switch means for connecting the generator to the line, sensing means for sensing the phase difference and frequency difference between the generator and the line, said sensing means including transformer means energized by corresponding phase voltages of the generator and of the line, rectifier means connected to rectify the output of the transformer means, and a capacitor and a resistor connected across the transformer means, whereby the sensing means provides a pulsating signal voltage representative of said phase and frequency differences, circuit means for providing an output voltage when said signal voltage is below a predetermined value, and means responsive to said output voltage for effecting closing of the switch means and for reducing the magnitude of the signal voltage to maintain the output voltage until the phase difference between the generator and the line exceeds a predetermined value.

5. A system for effecting paralleling of an alternating current generator with an energized alternating current line, said system including switch means for connecting the generator to the line, sensing means for sensing the phase difference and frequency difference between the generator and the line, said sensing means including transformer means energized by corresponding phase voltages of the generator and of the line, rectifier means connected to rectify the output of the transformer means, and a capacitor and a resistor connected across the transformer means, whereby the sensing means provides a pulsating signal voltage representative of said phase and frequency differences, circuit means for providing an output voltage when said signal voltage is below a predetermined value, and means responsive to said output voltage for effecting closing of the switch means and for effecting a change in the sensing means to reduce the magnitude of the signal voltage to maintain the output voltage until the phase difference between the generator and the line exceeds a predetermined value.

6. A system for effecting paralleling of an alternating current generator with an energized alternating current line, said system including switch means for connecting the generator to the line, sensing means for sensing the phase difference and frequency difference between the generator and the line, said sensing means including transformer means energized by corresponding phase voltages of the generator and of the line, rectifier means connected to rectify the output of the transformer means, and a capacitor and a resistor connected across the transformer means, whereby the sensing means provides a pulsating signal voltage representative of said phase and frequency differences, circuit means for providing an output voltage when said signal voltage is below a predetermined value, and means responsive to said output voltage for effecting closing of the switch means and for connecting a second resistor in the sensing means to reduce the magnitude of the signal voltage to maintain the output voltage until the phase difference between the generator and the line exceeds a predetermined value.

References Cited in the file of this patent

UNITED STATES PATENTS

| | | |
|---|---|---|
| 2,785,318 | Eisengrein et al. | Mar. 12, 1957 |
| 2,928,007 | Pratt | Mar. 8, 1960 |